(12) United States Patent
Nagy et al.

(10) Patent No.: US 7,122,497 B1
(45) Date of Patent: Oct. 17, 2006

(54) OLEFIN POLYMERIZATION CATALYST SYSTEM

(75) Inventors: Sandor Nagy, Naperville, IL (US); Barbara M. Tsuie, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/221,287

(22) Filed: Sep. 7, 2005

(51) Int. Cl.
*B01J 31/00* (2006.01)
*B01J 37/00* (2006.01)

(52) U.S. Cl. ............ 502/116; 502/103; 502/115; 502/123; 526/348; 526/124.2; 526/124.3; 526/128; 526/141

(58) Field of Classification Search .......... 526/348, 526/124.2, 124.3, 128, 141; 502/103, 115, 502/116, 123
See application file for complete search history.

(56) References Cited

U.S. PATENT DOCUMENTS

| | | | | |
|---|---|---|---|---|
| 4,464,518 A | * | 8/1984 | Iwabuchi et al. | 526/127 |
| 5,112,927 A | * | 5/1992 | Hara et al. | 526/124.8 |
| 5,225,502 A | * | 7/1993 | Sato et al. | 526/128 |
| 5,459,116 A | | 10/1995 | Ro et al. | 502/115 |
| 5,798,424 A | | 8/1998 | Kong et al. | 526/124.2 |
| 6,114,276 A | | 9/2000 | Kong et al. | 502/226 |
| 6,204,216 B1 | | 3/2001 | Nagy et al. | 502/103 |
| 6,320,003 B1 | * | 11/2001 | Nishimura et al. | 526/124.9 |
| 6,897,176 B1 | | 5/2005 | Nakayama et al. | 502/155 |

FOREIGN PATENT DOCUMENTS

EP 1238989 9/2002

OTHER PUBLICATIONS

J. Severn et al., *Polym Int* 54 (2005) 837.
Y. Nakayama et al., *Science and Technology In Catalysis* (2002) 517.

* cited by examiner

*Primary Examiner*—Ling-Sui Choi
(74) *Attorney, Agent, or Firm*—John Tyrell; Jonathan L. Schuchardt

(57) ABSTRACT

A catalyst system useful for polymerizing olefins is disclosed. The catalyst system comprises a cocatalyst and a supported transition metal prepared from a halogen-containing Group 4–6 transition metal compound and an organoaluminum-siloxane containing mixture. The latter mixture, which is prepared from an organoaluminum compound and an organomagnesium-siloxane reaction product, incorporates a chelating ligand. The invention includes a method for making the catalyst system and a process for polymerizing olefins using the catalyst system. The process is convenient and avoids expensive catalyst components used in known olefin polymerization processes.

13 Claims, No Drawings

OLEFIN POLYMERIZATION CATALYST SYSTEM

FIELD OF THE INVENTION

The invention relates to a catalyst system useful for polymerizing olefins. The catalyst system incorporates a chelating ligand as part of a supported transition metal mixture.

BACKGROUND OF THE INVENTION

Interest in catalysis continues to grow in the polyolefin industry. Many olefin polymerization catalysts are known, including conventional Ziegler-Natta catalysts. To improve polymer properties, single-site catalysts, in particular metallocenes are beginning to replace Ziegler-Natta catalysts. Single-site catalysts typically require large amounts of expensive activators such as methylalumoxane or salts of non-nucleophilic anions such as triphenylcarbenium tetrakis(pentafluorophenyl)borate. It would be desirable to incorporate some of the advantages of single-site catalysts, such as narrow molecular weight distribution and good comonomer incorporation, without the high cost due to the activators.

One useful Ziegler-Natta catalyst is disclosed in U.S. Pat. No. 4,464,518. A first component is made by reacting an organoaluminum compound with a mixture of linear and branched alcohols. Separately, a second component is made by reacting an organomagnesium compound with a silicon-containing compound. The first and second components are combined and then further reacted with a halogen-containing vanadium or titanium compound. Reaction of this product with another organoaluminum compound gives the final catalyst. The catalyst is described as being useful for ethylene polymerizations and ethylene copolymerizations with alpha-olefins such as propylene, 1-butene, 1-hexene or 1-octene. Single-site catalysts are not used. No chelating ligands are used. The catalyst is reported to yield polyethylene powder with a high bulk density.

Single-site catalysts typically feature at least one polymerization-stable, anionic ligand that is purely aromatic, as in a cyclopentadienyl system. All five carbons in the planar cyclopentadienyl ring participate in η-5 bonding to the metal. The cyclopentadienyl anion functions as a 6π-electron donor. Similar bonding apparently occurs with heteroatomic ligands such as boratabenzenyl or azaborolinyl.

Single-site catalysts are used with expensive activators such as alumoxanes, anionic compounds of boron, trialkylboron, and triarylboron compounds.

U.S. Pat. Nos. 5,459,116, 5,798,424, and 6,114,276 teach olefin polymerization catalysts that do not require the use of expensive activators. They employ chelated titanium compounds. Similarly, Eur. Pat. No. 1,238,989 and U.S. Pat. No. 6,897,176 do not require the use of expensive activators. The catalyst is a Lewis acid and a chelated transition metal compound containing 2 or more atoms selected from boron, nitrogen, oxygen, phosphorus, sulfur, and selenium. The Lewis acid may be a magnesium compound such as magnesium chloride, a dialkylmagnesium, a dialkoxymagnesium, an alkylmagnesium halide, an alkoxymagnesium halide, magnesium metal, or reduced magnesium compounds with a polysiloxane compound. The magnesium compound does not contain a chelating ligand and when an organoaluminum compound is used, it does not contain a chelating ligand. Polymethylhydrosiloxane is not used.

Vanadium (III) and titanium (III) amidinate complexes have been combined with a support prepared from $MgCl_2 \cdot 2.1EtOH$ and triethylaluminum (Polym. Int. 54 (2005) 837). The catalyst is combined with triisobutylaluminum and ethylene to give polyethylene with a low polydispersity in this single-site catalyst system. Neither a polymethylhydrosiloxane nor an organic magnesium halide is used, and the aluminum compounds used do not contain chelating ligands.

Transition metal complexes containing chelating ligands are known. U.S. Pat. No. 5,637,660 describes transition metal complexes containing chelating ligands based upon pyridine or quinoline. U.S. Pat. No. 6,204,216 describes single-site transition metal complexes based upon amine derivatives such as alkoxyamines. Science and Technology in Catalysis (2002) 517 describes transition metal complexes based upon phenoxyimines supported on magnesium chloride. While transition metal complexes containing chelating ligands are known, apparently polymerization catalysts incorporating a chelating ligand into an organomagnesium halide or an organoaluminum compound have not been contemplated. This has many advantages in ease of preparation of a wide variety of catalyst systems.

SUMMARY OF THE INVENTION

The invention is a catalyst system which comprises a cocatalyst and a supported transition metal. A polymethylhydrosiloxane is reacted with an organic magnesium halide and this product is combined with an organoaluminum compound. The organoaluminum-siloxane containing mixture contains a chelating ligand and is used to support a transition metal compound. By varying the chelating ligand, many versatile catalyst systems can be easily prepared. The invention includes a method for making the catalyst system and an olefin polymerization process performed in the presence of the catalyst system.

DETAILED DESCRIPTION OF THE INVENTION

Catalyst systems of the invention comprise a cocatalyst and a supported transition metal. The cocatalyst is a trialkylaluminum (e.g., triethylaluminum, triisobutylaluminum, or trimethylaluminum), a dialkylaluminum halide (e.g., diethylaluminum chloride or diisobutyl-aluminum bromide), or an alkylaluminum dihalide (ethylaluminum dichloride or isopropylaluminum dichloride). Preferably, the cocatalyst is a trialkylaluminum or a dialkylaluminum chloride.

The optimum amount of cocatalyst needed relative to the amount of supported transition metal depends on many factors, including the nature of the supported transition metal and cocatalyst, the purity of the solvent, the desired reaction rate, the reaction conditions, and other factors. Generally, however, the amount used will be within the range of about 0.01 to about 100 moles, preferably from about 0.1 to about 50 moles, and more preferably from about 1 to about 5 moles, of cocatalyst per mole of transition metal.

The catalyst system also includes a supported transition metal. The supported transition metal is the reaction product of a halogen-containing Group 4–6 transition metal compound and an organoaluminum-siloxane containing mixture. The transition metal compound does not contain chelating ligands or polymerization-stable, anionic ligands such as cyclopentadienyl ligands. Suitable transition metal compounds include titanium tetrachloride, diisopropoxytitanium dichloride, vanadium(V) oxychloride, vanadium trichloride, vanadium tetrachloride, zirconium tetrachloride, and zirconium tetrabromide. Titanium tetrachloride is preferred.

The organoaluminum-siloxane containing mixture is the reaction product of an organoaluminum compound and the organomagnesium-siloxane reaction product of a polymethylhydrosiloxane and an organic magnesium halide. Preferably, the organoaluminum compound has the formula $AlR_nX_{3-n}$, where n is an integer from 1 to 3, X is chlorine or bromine, and R is $C_1$ to $C_8$ hydrocarbyl, hydrogen, alkoxy, aryloxy, or a chelating ligand. Exemplary organoaluminum compounds include triethylaluminum, diethylaluminum chloride, ethylaluminum dichloride, diisobutylaluminum hydride, diethylaluminum ethoxide, diethylaluminum cyclohexoxide, and butylaluminum diphenoxide.

Optionally, the organoaluminum compound incorporates a chelating ligand. By "chelating ligand," we mean a ligand that can be attached to a central transition metal by bonds from at least two donor atoms selected from the group consisting of O, N, S, and P. The chelating ligand can be a bidentate, tridentate, or polydentate ligand. Preferably, the chelating ligand is bidentate.

Exemplary organoaluminum compounds containing a chelating ligand:

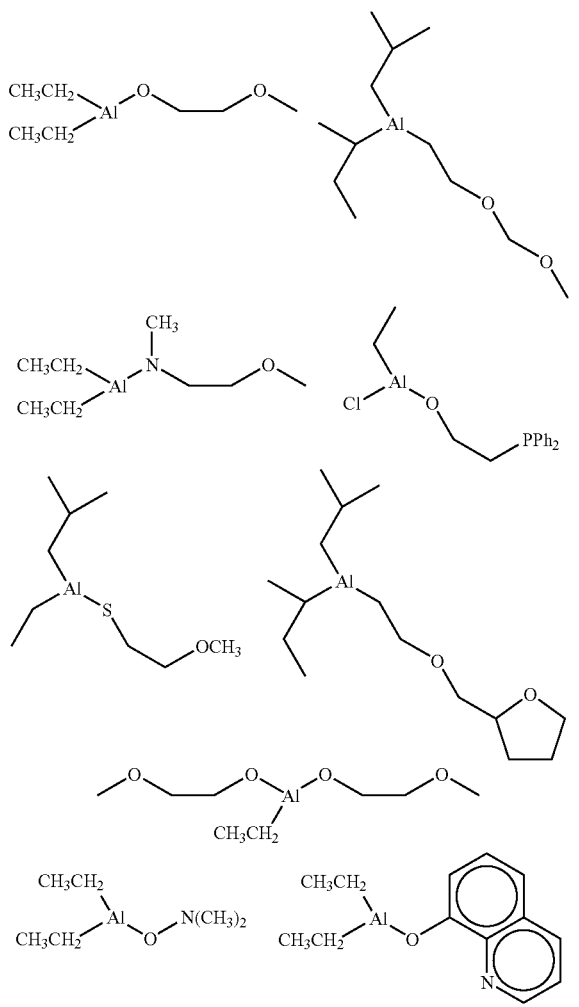

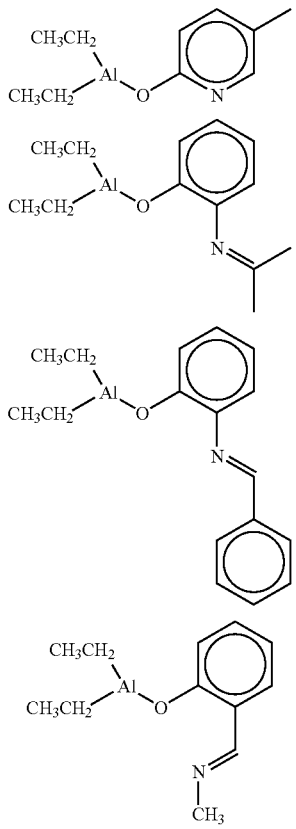

One convenient way to prepare organoaluminum compounds containing a chelating ligand is to treat an alkylaluminum compound with an amino or a hydroxyl compound and liberate an alkane. For example, treatment of triethylaluminum with 2-ethoxyethanol incorporates the chelating ligand, liberates ethane, and produces diethyl(2-ethoxyethoxy)aluminum:

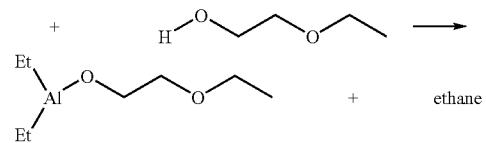

Preferred hydroxyl compounds are hydroxylamines, 2-hydroxypyridines, 8-hydroxyquinolines, hydroxyimines prepared from 2-hydroxyanilines, and hydroxyimines prepared from 2-hydroxybenzaldehydes. The amine could be, e.g., 2-aminoethanol N,1-dimethyl ether.

The organoaluminum compound is combined with the reaction product of a polymethylhydrosiloxane and an organic magnesium halide. The polymethylhydrosiloxane is any silicon compound containing recurring Si—O—Si bonds with some of the silicon atoms being substituted with both a methyl group and a hydrogen atom. By "polymethylhydrosiloxane," we include siloxane dimers, oligomers, polymers, and copolymers. Suitable polymethylhydrosiloxanes include, e.g.:

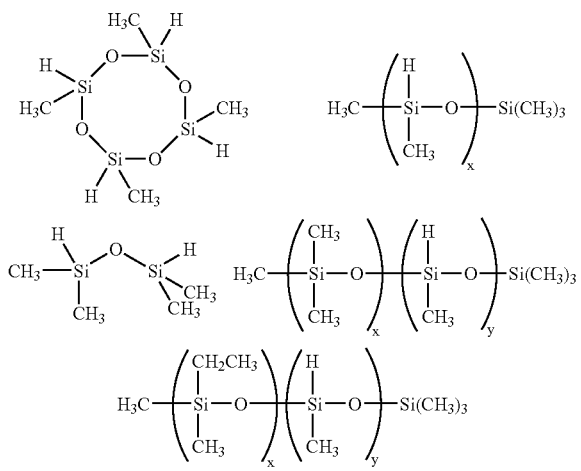

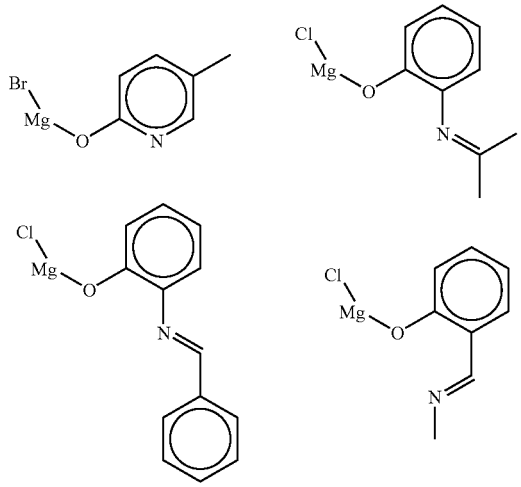

The organic magnesium halide preferably has the formula RMgX, where X is chlorine or bromine, and R is $C_1$ to $C_8$ hydrocarbyl, hydrogen, alkoxy, aryloxy, or a chelating ligand. Exemplary organic magnesium halides include ethylmagnesium chloride, isobutylmagnesium bromide, phenylmagnesium chloride, ethoxymagnesium chloride, and phenoxy-magnesium bromide. Alkyl- and arylmagnesium halides can be conveniently prepared by reacting the corresponding alkyl or aryl halide with magnesium metal. Alkoxymagnesium halides can be prepared from the corresponding alcohol, magnesium metal, and HCl or by reacting an alkylmagnesium halide with an alcohol. Aryloxymagnesium halides can be prepared from an alkylmagnesium halide and a phenol.

Optionally the organic magnesium halide incorporates a chelating ligand. At least one of the organoaluminum compound or the organic magnesium halide incorporates a chelating ligand. Exemplary organic magnesium halides containing a chelating ligand:

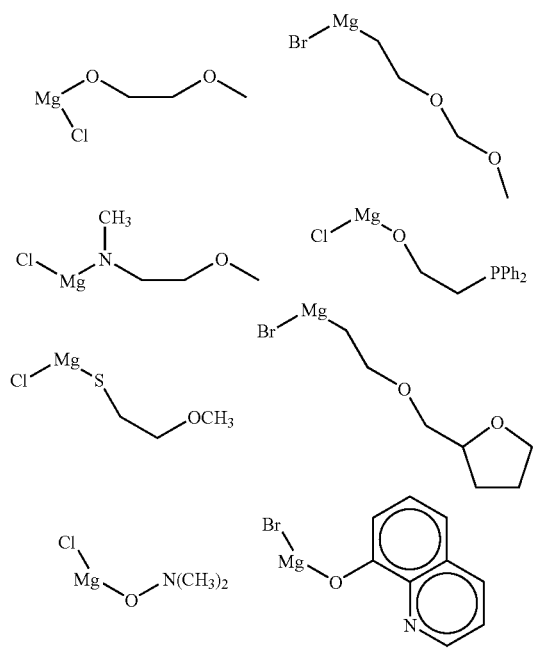

One convenient way to prepare organic magnesium halides containing a chelating ligand is to treat an alkylmagnesium halide with an amino or a hydroxyl compound and liberate an alkane. For example, treatment of butylmagnesium chloride with 2-ethoxyethanol liberates butane and incorporates the chelating ligand:

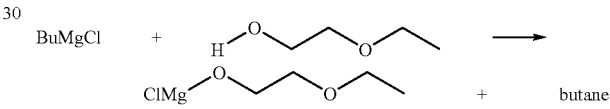

Preferred hydroxyl compounds are hydroxylamines, 2-hydroxypyridines, 8-hydroxyquinolines, hydroxyimines prepared from 2-hydroxyanilines, and hydroxyimines prepared from 2-hydroxybenzaldehydes. The amine could be, e.g., 2-aminoethanol N,1-dimethyl ether.

Preferably, the organic magnesium halide is prepared in an ether solvent or an ether-hydrocarbon mixed solvent. Suitable solvents include diethyl ether, tetrahydrofuran, dioxane, hexane, heptane, toluene, and the like, and mixtures thereof. Preferably, the organic magnesium halide is used in-situ and the polymethylhydrosiloxane is added portionwise to a stirring mixture of the organic magnesium halide and solvent. Preferably, the polymethylhydrosiloxane is added in an amount to give a molar ratio of Si to Mg of 0.1:1 to 20:1. More preferably, the molar ratio of Si to Mg is 1:1 to 10:1. Preferably, the polymethylhydrosiloxane and organic magnesium halide are stirred at a temperature from about 10° C. to about 80° C. for about 0.5 to 10 hours after addition and the solvent is then removed by vacuum. Optionally, before solvent removal, the reaction product is diluted with a hydrocarbon solvent having a boiling point higher than the ether and then a portion of the solvent is removed by vacuum to remove most of the ether component.

The organomagnesium-siloxane reaction product is combined with the organoaluminum compound. Preferably, the organomagnesium-siloxane reaction product is diluted in an inert hydrocarbon solvent such as hexane or toluene and added in portions to a stirring mixture of the organoaluminum compound in an inert hydrocarbon solvent. Optionally, the organoaluminum compound is made in-situ in a hydrocarbon solvent and then the organomagnesium-siloxane reaction product is added directly. For example, if the organoaluminum compound contains an alkoxy group, the precursor aluminum compound can be stirred with the alcohol in a hydrocarbon solvent and then the organomagnesium-siloxane reaction product is added directly to the reaction mixture. Preferably, the organomagnesium-siloxane reaction product is added in an amount to give a molar ratio of Al to Mg of 1:1 to 100:1. More preferably, the molar ratio of Al to Mg is 1.5:1 to 20:1.

The organoaluminum-siloxane containing mixture is then reacted with a halogen-containing Group 4–6 transition metal. The reaction is preferably carried out in an inert solvent such as hexane or toluene. Preferably, the reaction temperature is from about 0° to about 150° C., more preferably from about 25° C. to about 60° C. Preferably, the organoaluminum-siloxane containing mixture is reacted with the halogen-containing Group 4–6 transition metal in a ratio of from 1 to 20 moles of transition metal per mole of aluminum. Preferably, after completion of the reaction, the solid supported transition metal mixture is separated and washed with a hydrocarbon solvent to remove unreacted transition metal compound.

The catalyst system, comprising the cocatalyst and the supported transition metal, can be used to polymerize olefins. Suitable olefins for the polymerization are $C_2$–$C_{20}$ α-olefins such as ethylene, propylene, 1-butene, 1-hexene, and 1-octene, cyclic olefins such as cyclohexene, and non-conjugated dienes such as ethylidene norbornene, and mixtures thereof. Preferred olefins are ethylene, propylene, and mixtures thereof with α-olefins such as 1-butene, 1-hexene, and 1-octene. More preferably ethylene is copolymerized with a $C_3$–$C_{20}$ α-olefin. Most preferably, ethylene is copolymerized with 1-butene, 1-hexene, or 1-octene.

Optionally, hydrogen is used in the polymerization to regulate polyolefin molecular weight. The amount of hydrogen needed depends upon the desired polyolefin molecular weight and flow properties. Generally, as the amount of hydrogen is increased, the polyolefin molecular weight decreases and the melt flow rate increases. For many applications, the polyolefin melt flow rate will be too low if the polymerization is performed in the absence of hydrogen.

The cocatalyst can be added directly to the polymerization reactor before or after adding the supported transition metal mixture. Preferably some or all of the cocatalyst is added before the supported transition metal. Optionally, the cocatalyst is premixed with the supported transition metal prior to addition to the polymerization reactor. When the cocatalyst is premixed, preferably it is added to a slurry of the supported transition metal complex in an inert solvent. It is preferable to use a portion of the cocatalyst and to add the remainder of the cocatalyst to the reactor prior to the addition of the premix.

The invention includes a method for making the catalyst system. The method comprises: (a) reacting a polymethylhydrosiloxane with an organic magnesium halide to produce an organomagnesium siloxane; (b) reacting the organomagnesium siloxane with an organoaluminum compound to produce an organoaluminum-siloxane containing mixture; (c) reacting the organoaluminum-siloxane containing mixture with a halogen-containing Group 4–6 transition metal compound to produce a supported transition metal; and (d) combining the supported transition metal with a cocatalyst. The cocatalyst is selected from trialkylaluminums, dialkylaluminum halides, and alkylaluminum dihalides. At least one of the organic magnesium halide (in step (a)) or the organoaluminum compound (in step (b)) incorporates a chelating ligand.

A wide variety of olefin polymerization processes can be used. Preferred processes are slurry, bulk, solution, and gas-phase processes. A slurry or gas-phase process is preferably used.

The polymerizations can be performed over a wide temperature range, such as from about −30° C. to about 280° C. A more preferred range is from about 30° C. to about 180° C.; most preferred is the range from about 60° C. to about 100° C. Olefin partial pressures normally range from about 0.1 MPa to about 350 MPa. More preferred is the range from about 0.2 MPa to about 10 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Catalyst From Alkoxymagnesium Chloride 1

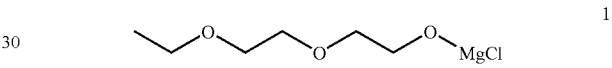

Diethylene glycol ethyl ether (1 mole) is added over 30 minutes to a stirring mixture of 1 mole of n-butylmagnesium chloride in 500 mL of dry tetrahydrofuran. Butane evolves and stirring continues for 1 hour at room temperature. Trimethylsilyl-terminated poly(methylhydrosiloxane) (300 grams; $M_n$ approximately 2300) is added over 30 minutes. The mixture is heated one hour at 60° C. and tetrahydrofuran is removed with vacuum. Toluene (500 mL) is added, the mixture is stirred, and vacuum is applied to remove residual tetrahydrofuran. Toluene (750 mL) is added, and the mixture is added to a stirring solution of 3 moles of diethylaluminum chloride in 300 mL of toluene. The organoaluminum-siloxane containing mixture is heated for 2 hours at reflux, cooled to room temperature, and 2 moles of titanium tetrachloride is added dropwise over one hour. The mixture is heated for two hours at 70° C. and cooled. n-Hexane (1 L) is added, and the mixture is filtered. The solid is washed thoroughly with n-hexane and dried to obtain the supported transition metal mixture.

EXAMPLE 2

Polymerization

A 2-L stainless steel polymerization reactor is pressure purged with dry nitrogen three times at 70° C. The reactor is completely vented and hydrogen is added as a 1.7 MPa pressure drop from a 7-mL vessel. A solution of 100 mL 1-hexene, 1 L isobutane, and 1 mmol triisobutylaluminum is added to the reactor followed by 6 mg of the supported transition metal mixture from Example 1. Ethylene is added to give a total reactor pressure of 2.4 MPa. Temperature is maintained at 70° C. and ethylene pressure is fed on demand to maintain 2.4 MPa for 30 minutes. The polymerization continues for 30 minutes and the reactor is vented to remove the volatiles. An ethylene-hexene copolymer with narrow molecular weight distribution is the expected product.

EXAMPLE 3

The procedure of Example 1 is repeated, substituting N,N-dimethylhydroxylamine for diethylene glycol ethyl ether to obtain a supported transition metal mixture that is expected to be an effective polymerization catalyst.

EXAMPLE 4

The general procedure of Example 1 is repeated, substituting the imine prepared from 2-hydroxybenzaldehyde and aniline for diethylene glycol ethyl ether to obtain a supported transition metal mixture that is expected to be an effective polymerization catalyst.

EXAMPLE 5

Catalyst From Alkoxyaluminum Compound 2

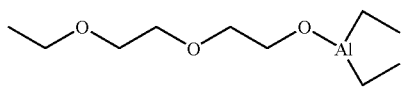

Trimethylsilyl-terminated poly(methylhydrosiloxane) (300 grams; $M_n$ approximately 2300) is added over 30 minutes to a stirring mixture of 1 mole of n-butylmagnesium chloride in 500 mL of dry tetrahydrofuran. The mixture is heated one hour at 60° C. and tetrahydrofuran is removed with vacuum. Toluene (500 mL) is added, the mixture stirred, and vacuum is applied to remove residual tetrahydrofuran. Toluene (750 mL) is added, and the mixture is added to a stirring mixture of alkoxyaluminum compound 2. The aluminum compound is prepared earlier by adding diethylene glycol ethyl ether (3 moles) over 2 hours to a solution of 3 moles of triethylaluminum in 300 mL of toluene. The organoaluminum-siloxane containing mixture is heated for 2 hours at reflux, cooled to room temperature, and 2 moles of titanium tetrachloride is added dropwise over one hour. The mixture is heated for two hours at 70° C. and cooled. n-Hexane (1 L) is added, and the mixture is filtered. The solid is washed thoroughly with n-hexane and dried to obtain the supported transition metal mixture, which is expected to be an effective polymerization catalyst.

The preceding examples are meant only as illustrations. The following claims define the invention.

We claim:
1. A catalyst system which comprises:
a) a cocatalyst selected from the group consisting of trialkylaluminums, dialkylaluminum halides, and alkylaluminum dihalides; and
b) a supported transition metal comprising the reaction product of:
1) a halogen-containing Group 4–6 transition metal compound; and
2) an organoaluminum-siloxane containing mixture comprising the reaction product of:
(a) an organoaluminum compound; and
(b) the reaction product of a polymethylhydrosiloxane and an organic magnesium halide;
wherein at least one of the organoaluminum compound or the organic magnesium halide incorporates a chelating ligand.
2. The catalyst system of claim 1 wherein the organic magnesium halide incorporates the chelating ligand.
3. The catalyst system of claim 2 wherein the chelating ligand is derived from a hydroxyl compound.
4. The catalyst system of claim 3 wherein the hydroxyl compound is selected from the group consisting of hydroxylamines, 2-hydroxypyridines, 8-hydroxyquinolines, hydroxyimines prepared from 2-hydroxyanilines, and hydroxyimines prepared from 2-hydroxybenzaldehydes.
5. The catalyst system of claim 4 wherein the hydroxyl compound is a hydroxylamine.
6. The catalyst system of claim 1 wherein the organoaluminum compound incorporates a chelating ligand.
7. The catalyst system of claim 6 wherein the chelating ligand is derived from a hydroxyl compound.
8. The catalyst system of claim 7 wherein the hydroxyl compound is selected from the group consisting of hydroxylamines, 2-hydroxypyridines, 8-hydroxyquinolines, hydroxyimines prepared from 2-hydroxyanilines, and hydroxyimines prepared from 2-hydroxybenzaldehydes.
9. The catalyst system of claim 8 wherein the hydroxyl compound is a hydroxylamine.
10. A method for making a catalyst system, comprising:
(a) reacting a polymethylhydrosiloxane with an organic magnesium halide to produce an organomagnesium siloxane;
(b) reacting the organomagnesium siloxane with an organoaluminum compound to produce an organoaluminum-siloxane containing mixture;
(c) reacting the organoaluminum-siloxane containing mixture with a halogen-containing Group 4–6 transition metal compound to produce a supported transition metal; and
(d) combining the supported transition metal with a cocatalyst selected from the group consisting of trialkylaluminums, dialkylaluminum halides, and alkylaluminum dihalides;
wherein at least one of the organic magnesium halide or the organoaluminum compound incorporates a chelating ligand.
11. A process comprising polymerizing an olefin using the catalyst system of claim 1.
12. The process of claim 11 wherein the olefin is selected from the group consisting of ethylene, propylene, 1-butene, 1-hexene, 1-octene, and mixtures thereof.
13. A slurry polymerization process of claim 11.

* * * * *